US009355022B2

(12) United States Patent
Ravimohan et al.

(10) Patent No.: US 9,355,022 B2
(45) Date of Patent: May 31, 2016

(54) SYSTEMS AND METHODS FOR INTELLIGENT FLASH MANAGEMENT

(71) Applicant: SanDisk Technologies Inc., Plano, TX (US)

(72) Inventors: Narendhiran Chinnaanangur Ravimohan, Karnataka (IN); Vithya Kannappan, Karnataka (IN); Saranya Nedunchezhiyan, Karnataka (IN)

(73) Assignee: SanDisk Technologies Inc., Plano, TX (US)

( * ) Notice: Subject to any disclaimer, the term of this patent is extended or adjusted under 35 U.S.C. 154(b) by 230 days.

(21) Appl. No.: 13/784,429

(22) Filed: Mar. 4, 2013

(65) Prior Publication Data

US 2014/0164681 A1 Jun. 12, 2014

Related U.S. Application Data

(63) Continuation of application No. PCT/US2013/028180, filed on Feb. 28, 2013.

(30) Foreign Application Priority Data

Dec. 7, 2012 (IN) .......................... 5099/CHE/2012

(51) Int. Cl.
*G06F 12/02* (2006.01)
*G06F 3/06* (2006.01)

(52) U.S. Cl.
CPC .............. *G06F 12/023* (2013.01); *G06F 3/061* (2013.01); *G06F 3/064* (2013.01); *G06F 3/0679* (2013.01)

(58) Field of Classification Search
CPC ... G06F 12/02; G06F 12/0246; G06F 12/023; G06F 3/0679; G06F 3/0649; G06F 3/064; G06F 3/061

USPC ......... 711/103, 112, 114, 119, 162, 170, 202, 711/E12.02; 710/52, 56; 707/999.204; 365/120, 189.05, 222, 236
See application file for complete search history.

(56) References Cited

U.S. PATENT DOCUMENTS

2008/0155177 A1 6/2008 Sinclair et al.
2008/0288436 A1* 11/2008 Priya ............................... 706/48

(Continued)

OTHER PUBLICATIONS

Han et al, "An Intelligent Garbage Collection Algorithm for Flash Memory Storages", Computational Science and Its Applications ICCSA 2006, International Conference Glasgow UK, May 8-11, 2006, pp. 1019-1027.*

(Continued)

*Primary Examiner* — Kevin Verbrugge
*Assistant Examiner* — Kamal Dewan
(74) *Attorney, Agent, or Firm* — Brinks Gilson & Lione

(57) ABSTRACT

Systems and method for performing intelligent flash management are disclosed. A controller may determine if a write pattern exists between a set of writes associated with a first data chunk and a set of writes associated with a second data chunk based on whether a number of writes for first data chunk is equal to a number of writes for second data chunk; a degree to which a sequence of logical block address for the first data chunk matches the sequence of logical block addresses for the second data chunk; and a degree to which a size of each write for the first data chunk matches a size of each write for the second data chunk. The controller may then perform storage management operations based on whether or not a write pattern exists.

22 Claims, 8 Drawing Sheets

(56) References Cited

U.S. PATENT DOCUMENTS

| | | | |
|---|---|---|---|
| 2009/0164705 A1* | 6/2009 | Gorobets | 711/103 |
| 2010/0241789 A1* | 9/2010 | Chu et al. | 711/103 |
| 2012/0144095 A1* | 6/2012 | Han et al. | 711/103 |
| 2013/0080688 A1* | 3/2013 | Park | G06F 12/0246 711/103 |

OTHER PUBLICATIONS

International Search Report and Written Opinion for PCT/US2013/028180, dated May 28, 2013, 10 pages.

International Preliminary Report on Patentability and Written Opinion of the International Searching Authority date of mailing Jun. 18, 2015—9 pages.

* cited by examiner

SYSTEMS AND METHODS FOR INTELLIGENT FLASH MANAGEMENT

RELATED APPLICATIONS

The present application is a continuation of PCT Application Num. PCT/US13/28180, filed Feb. 28, 2013, which claims priority to Indian Application Num. 5099/CHE/2012, filed Dec. 7, 2012, the entirety of each of which are hereby incorporated in their entirety by reference.

BACKGROUND

In traditional storage systems, a host sends a command to a storage system to store data at one or more logical block addresses. A controller of the storage system converts the logical block addresses to one or more physical addresses and places the data for the logical block addresses in an update memory block. The controller maintains the data in the update memory block until a frequency of updates to the update memory block decreases. At that time, the controller may store the data in a data block of the storage system.

Hosts may write to the memory card in determinable patterns while performing actions such as recording a video or taking a picture. During video recording, the host may choose to process the incoming video data every second, every five seconds, or in any other periodic interval, and write the data to the memory card with the same periodicity following the same write pattern. During picture capture, since the host is likely to capture consecutive pictures in the same resolution with the same settings, each picture is likely to follow similar write patterns.

Because controllers do not monitor data writes for write patterns, controllers may maintain data in update memory blocks for longer periods than necessary or write data from an update block into data blocks earlier than necessary As a result, controllers may perform more storage management operations, such as garbage collection operations, than necessary, thereby decreasing the endurance of the storage system. More advanced storage systems are desirable where a controller is able to detect write patterns in data written to a storage system and utilize a detected write pattern to more efficiently perform storage management operations.

SUMMARY

The present disclosure is directed to systems and methods for intelligent flash management. In one aspect, a method for performing storage management operations is disclosed. A controller of a storage system determines whether a number of writes to a storage device associated with a first data chunk is substantially equal to a number of writes to the storage device associated with a second data chunk. The controller further determines a degree to which a sequence of logical block addresses associated with the first data chunk matches a sequence of logical block addresses associated with the second data chunk. The controller additionally determines a degree to which a size of each write of data associated with first data chunk matches a size of each write of data associated with the second data chunk.

The controller then determines whether or not a write pattern exists based on at least one of the determination of whether the number of writes associated with the first data chunk is substantially equal to the number of writes associated with the second data chunk, the degree to which the sequence of logical block addresses associated with the first data chunk matches the sequence of logical block addresses associated with the second data chunk, and the degree to which the size of each write associated with the first data chunk matches the size of each write associated with the second data chunk. The controller of the storage system then performs storage management operations within the storage system based on the determination of whether or not a write pattern exists.

In another aspect, a storage system including a non-volatile memory and a processor in communication with the non-volatile memory is disclosed. The controller is configured to determine whether a number of writes to the non-volatile memory associated with a first data chunk is substantially equal to a number of writes to the non-volatile memory associated with a second data chunk. The processor is further configured to determine a degree to which a sequence of logical block addresses associated with the first data chunk matches a sequence of logical block addresses associated with the second data chunk, and to determine a degree to which a size of each write of data associated with first data chunk matches a size of each write of data associated with the second data chunk.

The processor is further configured to determine whether or not a write pattern exists based on at least one of the determination of whether the number of writes associated with the first data chunk is substantially equal to the number of writes associated with the second data chunk, the degree to which the sequence of logical block addresses associated with the first data chunk matches the sequence of logical block addresses associated with the second data chunk, and the degree to which the size of each write associated with the first data chunk matches the size of each write associated with the second data chunk. The processor is additionally configured to perform, storage management operations within the non-volatile memory based on the determination of whether or not a write pattern exists.

DETAILED DESCRIPTION OF THE DRAWINGS

The present disclosure is directed to systems and methods for performing intelligent flash management by identifying write patterns in data chunks written to a storage system, and performing storage management operations based on the identified written patterns. As explained in more detail below, a controller located in a host device or a storage device may monitor writes to a storage system, such as a storage device, and detect write patterns to the storage system. Once a write pattern is recognized and verified, the controller may utilize the detected write pattern to perform operations such as efficiently performing storage management operations or correcting misaligned page boundary writes, thereby increasing performance and endurance of the storage system.

Figure 1:
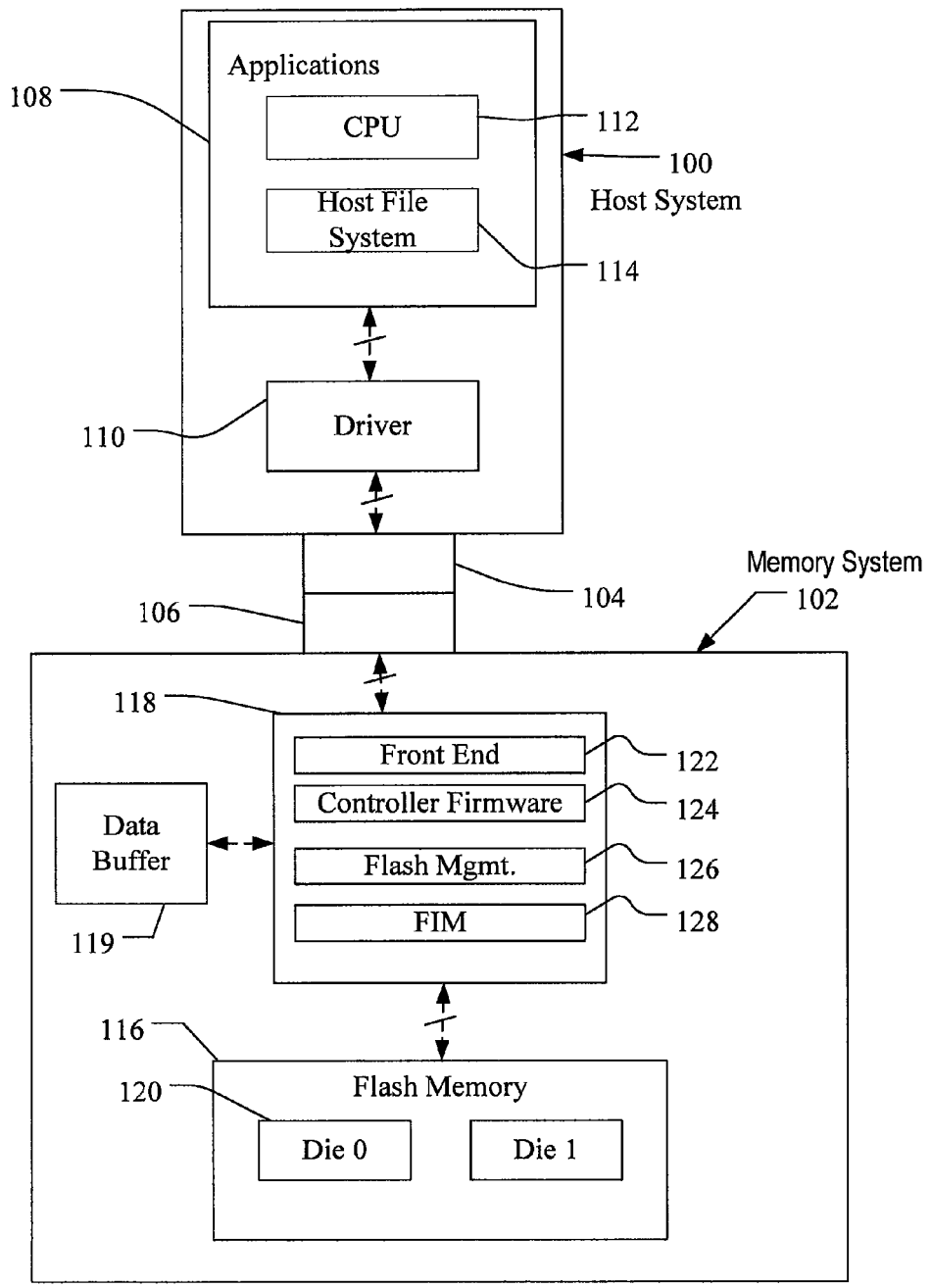
FIG. 1 illustrates a host connected with a memory system having a multi-bank non-volatile memory containing multiple die that may implement the disclosed methods for performing intelligent flash management.

A flash memory system suitable for use in implementing aspects of the invention is shown in FIGS. 1-6. A host system 100 of FIG. 1 stores data into and retrieves data from a memory system 102. The memory system may be flash memory embedded within the host, such as in the form of a solid state disk (SSD) drive installed in a personal computer. Alternatively, the memory system 102 may be in the form of a card that is removably connected to the host through mating parts 104 and 106 of a mechanical and electrical connector as illustrated in FIG. 1. A flash memory configured for use as an internal or embedded SSD drive may look similar to the schematic of FIG. 1, with the primary difference being the location of the memory system 102 internal to the host. SSD drives may be in the form of discrete modules that are drop-in replacements for rotating magnetic disk drives.

The host system 100 of FIG. 1 may be viewed as having two major parts, in so far as the memory system 102 is concerned, made up of a combination of circuitry and software. They are an applications portion 108 and a driver portion 110 that interfaces with the memory system 102. In a PC, for example, the applications portion 108 can include a processor 112 running word processing, graphics, control or other popular application software, as well as the file system 114 for managing data on the host 100. In a camera, cellular telephone or other host system that is primarily dedicated to perform a single set of functions, the applications portion 108 includes the software that operates the camera to take and store pictures, the cellular telephone to make and receive calls, and the like.

The memory system 102 of FIG. 1 may include non-volatile memory, such as flash memory 116; a system controller 118 that both interfaces with the host 100 to which the memory system 102 is connected for passing data back and forth and controls the memory 116; and one or more data buffers 119 coupled with the system controller 118 that the system controller 118 utilizes to buffer data before storing the data to the flash memory 116. The system controller 118 may convert between logical addresses of data used by the host 100 and physical addresses of the flash memory 116 during data programming and reading. The flash memory 116 may include any number of memory die 120 and two memory die are shown in FIG. 1 simply by way of illustration.

Functionally, the system controller 118 may include a front end 122 that interfaces with the host system, controller logic 124 for coordinating operation of the memory 116, flash management logic 126 for internal memory management operations such as garbage collection, and one or more flash interface modules (FIMs) 128 to provide a communication interface between the controller with the flash memory 116.

Figure 2:
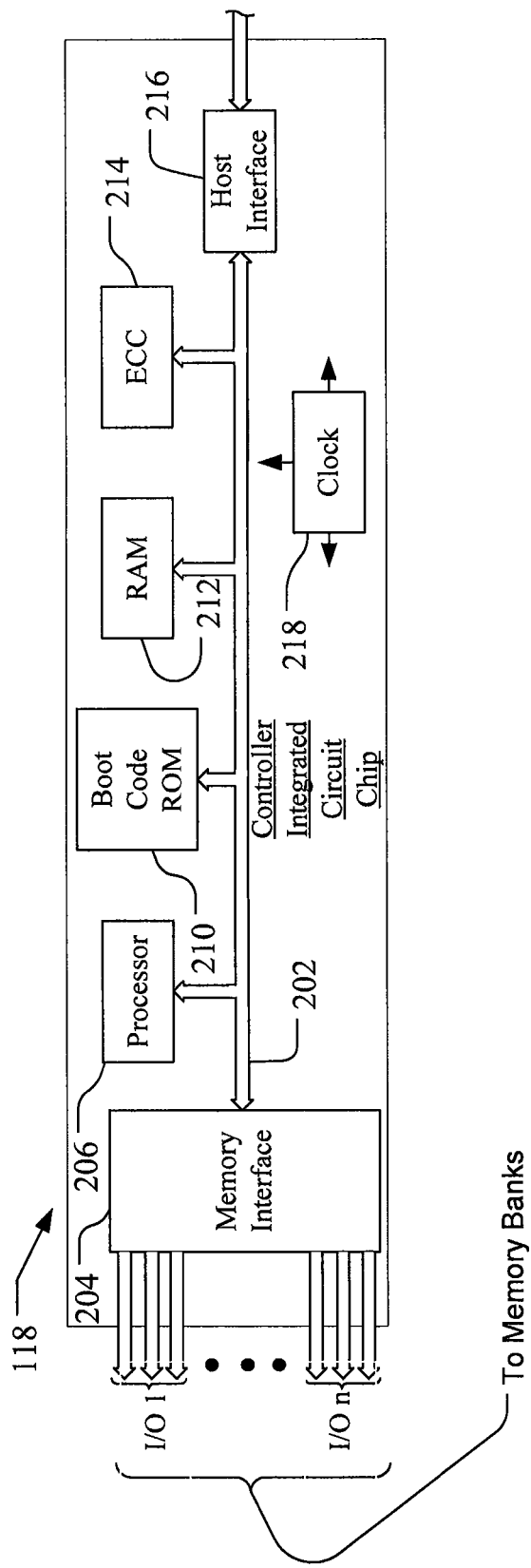
FIG. 2 is an example block diagram of an example flash memory system controller for use in the multiple die non-volatile memory of F FIG. 1.

The system controller 118 may be implemented on a single integrated circuit chip, such as an application specific integrated circuit (ASIC) such as shown in FIG. 2. The processor 206 of the system controller 118 may be configured as a multi-thread processor capable of communicating separately with each of the respective memory banks 120 via a memory interface 204 having I/O ports for each of the respective banks 120 in the flash memory 116. The system controller 118 may include an internal clock 218. The processor 206 communicates with an error correction code (ECC) module 214, a RAM buffer 212, a host interface 216, and boot code ROM 210 via an internal data bus 202.

Figure 3:
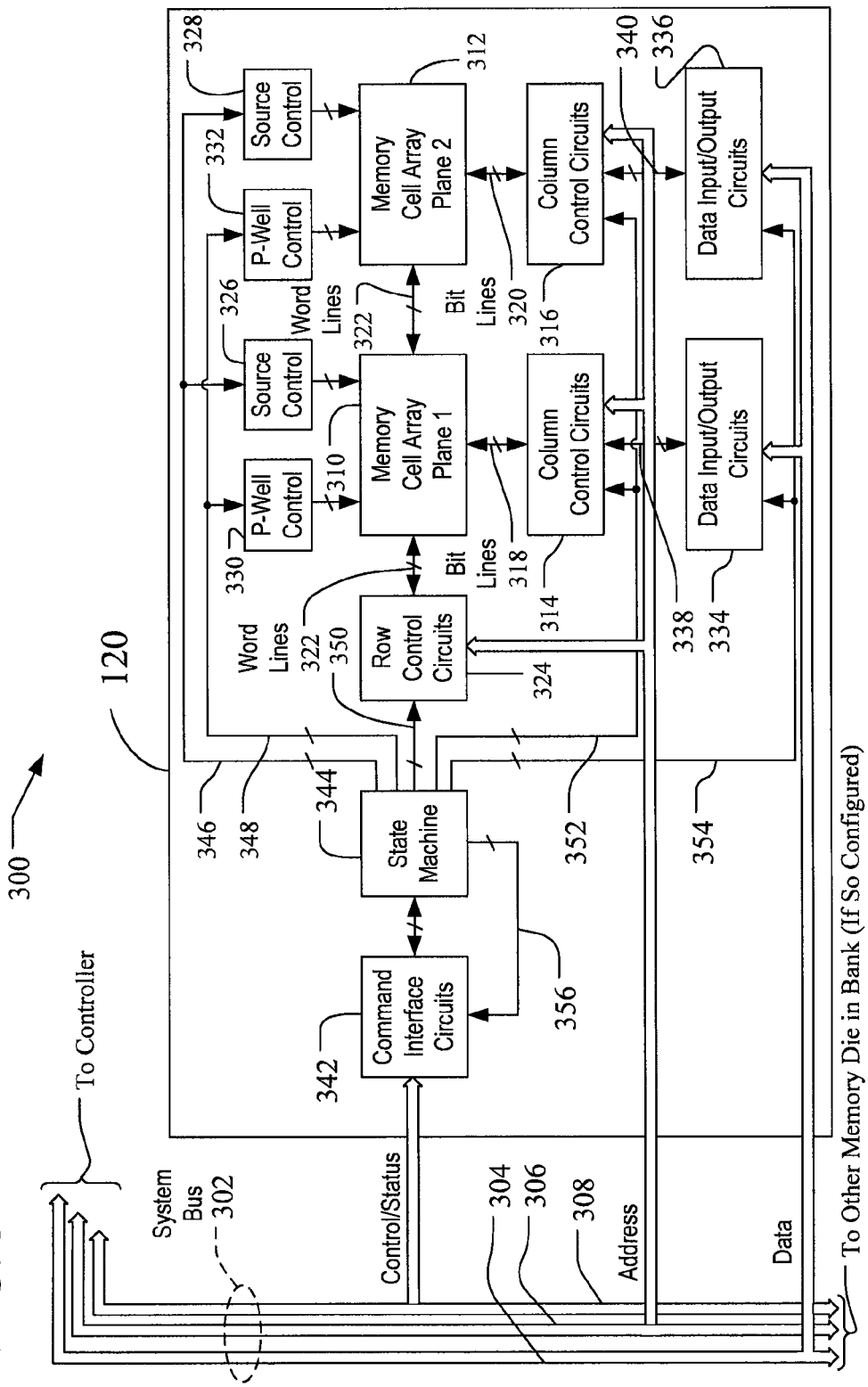
FIG. 3 is an example one flash memory bank suitable as one of the non-volatile memory banks illustrated in FIG. 1.

Each die 120 in the flash memory 116 may contain an array of memory cells organized into multiple planes. FIG. 3 shows such planes 310 and 312 for simplicity but a greater number of planes, such as four or eight planes, may instead be used. Alternatively, the memory cell array of a memory bank may not be divided into planes. When so divided, however, each plane has its own column control circuits 314 and 316 that are operable independently of each other. The circuits 314 and 316 receive addresses of their respective memory cell array from the address portion 306 of the system bus 302, and decode them to address a specific one or more of respective bit lines 318 and 320. The word lines 322 are addressed through row control circuits 324 in response to addresses received on the address bus 306. Source voltage control circuits 326 and 328 are also connected with the respective planes, as are p-well voltage control circuits 330 and 332. If the bank 300 is in the form of a memory chip with a single array of memory cells, and if two or more such chips exist in the system, data are transferred into and out of the planes 310 and 312 through respective data input/output circuits 334 and 336 that are connected with the data portion 304 of the system bus 302. The circuits 334 and 336 provide for both programming data into the memory cells and for reading data from the memory cells of their respective planes, through lines 338 and 340 connected to the planes through respective column control circuits 314 and 316.

Although the processor 206 in the system controller 118 controls the operation of the memory chips in each bank 120 to program data, read data, erase and attend to various housekeeping matters, each memory chip also contains some controlling circuitry that executes commands from the controller 118 to perform such functions. Interface circuits 342 are connected to the control and status portion 308 of the system bus 302. Commands from the controller 118 are provided to a state machine 344 that then provides specific control of other circuits in order to execute these commands. Control lines 346-354 connect the state machine 344 with these other circuits as shown in FIG. 3. Status information from the state machine 344 is communicated over lines 356 to the interface 342 for transmission to the controller 118 over the bus portion 308.

A NAND architecture of the memory cell arrays 310 and 312 is discussed below, although other architectures, such as NOR, can be used instead. An example NAND array is illustrated by the circuit diagram of FIG. 4, which is a portion of the memory cell array 310 of the memory bank 300 of FIG. 3. A large number of global bit lines are provided, only four such lines 402-408 being shown in FIG. 4 for simplicity of explanation. A number of series connected memory cell strings 410-424 are connected between one of these bit lines and a reference potential. Using the memory cell string 414 as representative, a plurality of charge storage memory cells 426-432 are connected in series with select transistors 434 and 436 at either end of the string. When the select transistors of a string are rendered conductive, the string is connected between its bit line and the reference potential. One memory cell within that string is then programmed or read at a time.

Figure 4:
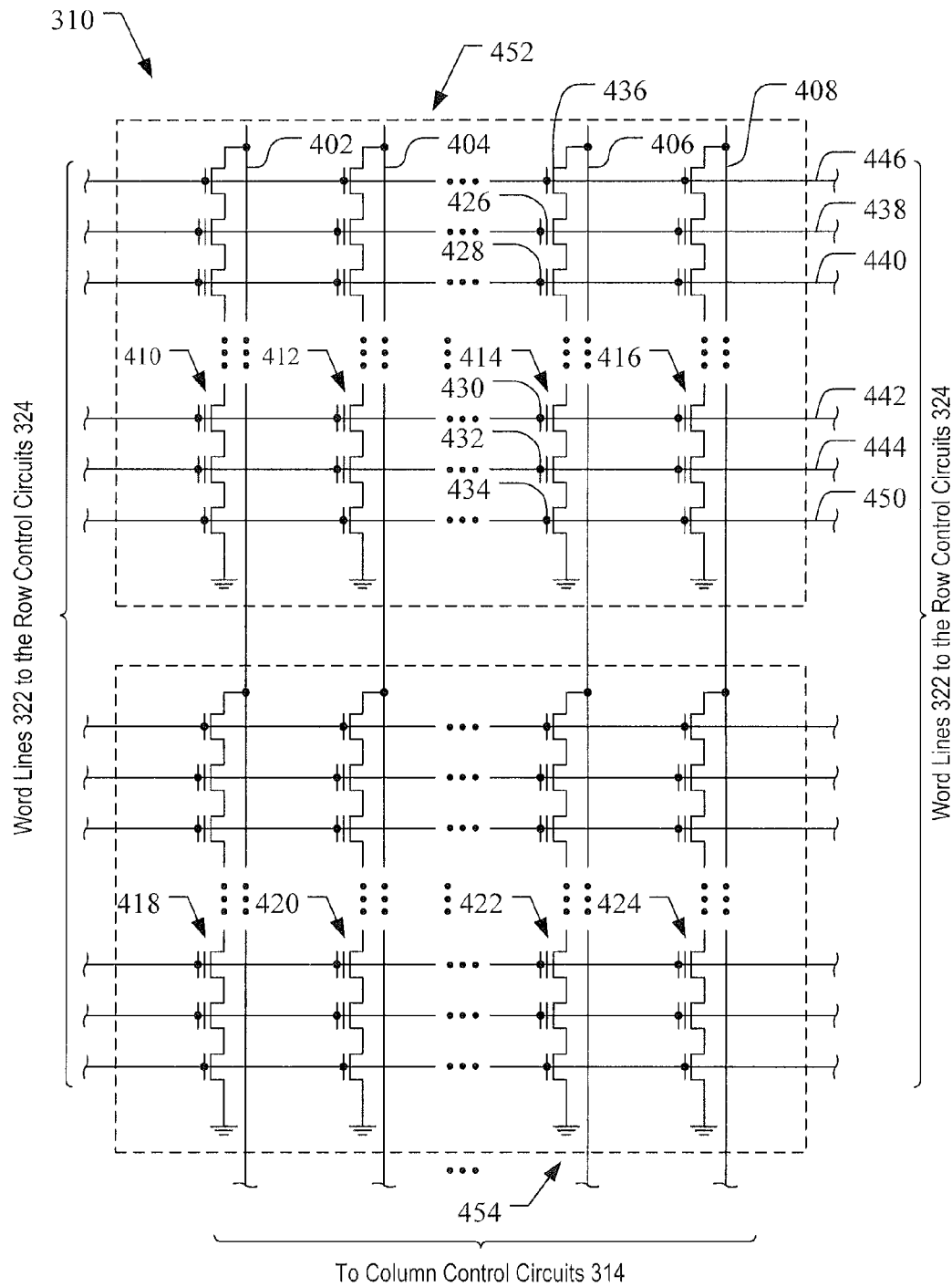
FIG. 4 is a representative circuit diagram of a memory cell array that may be used in the memory bank of FIG. 3.

Word lines 438-444 of FIG. 4 individually extend across the charge storage element of one memory cell in each of a number of strings of memory cells, and gates 446 and 450 control the states of the select transistors at each end of the strings. The memory cell strings that share common word and control gate lines 438-450 are made to form a block 452 of memory cells that are erased together. This block of cells contains the minimum number of cells that are physically erasable at one time. One row of memory cells, those along one of the word lines 438-444, are programmed at a time. Typically, the rows of a NAND array are programmed in a prescribed order, in this case beginning with the row along the word line 444 closest to the end of the strings connected to ground or another common potential. The row of memory cells along the word line 442 is programmed next, and so on, throughout the block 452. However, in other implementations, the rows of a NAND array are not programmed in sequential order for reasons such as reducing coupled between adjacent word lines.

A second block 454 is similar, its strings of memory cells being connected to the same global bit lines as the strings in the first block 452 but having a different set of word and control gate lines. The word and control gate lines are driven to their proper operating voltages by the row control circuits 324. If there is more than one plane in the system, such as planes 1 and 2 of FIG. 3, one memory architecture uses common word lines extending between them. There can alternatively be more than two planes that share common word lines. In other memory architectures, the word lines of individual planes are separately driven.

The memory cells may be operated to store two levels of charge so that a single bit of data is stored in each cell. This is typically referred to as a binary or single level cell (SLC) memory. Alternatively, the memory cells may be operated to store more than two detectable levels of charge in each charge storage element or region, thereby to store more than one bit of data in each. This latter configuration is referred to as multi level cell (MLC) memory. Both types of memory cells may be used in a memory, for example binary flash memory may be used for caching data and MLC memory may be used for longer term storage. The charge storage elements of the memory cells are most commonly conductive floating gates but may alternatively be non-conductive dielectric charge trapping material.

Figure 5:
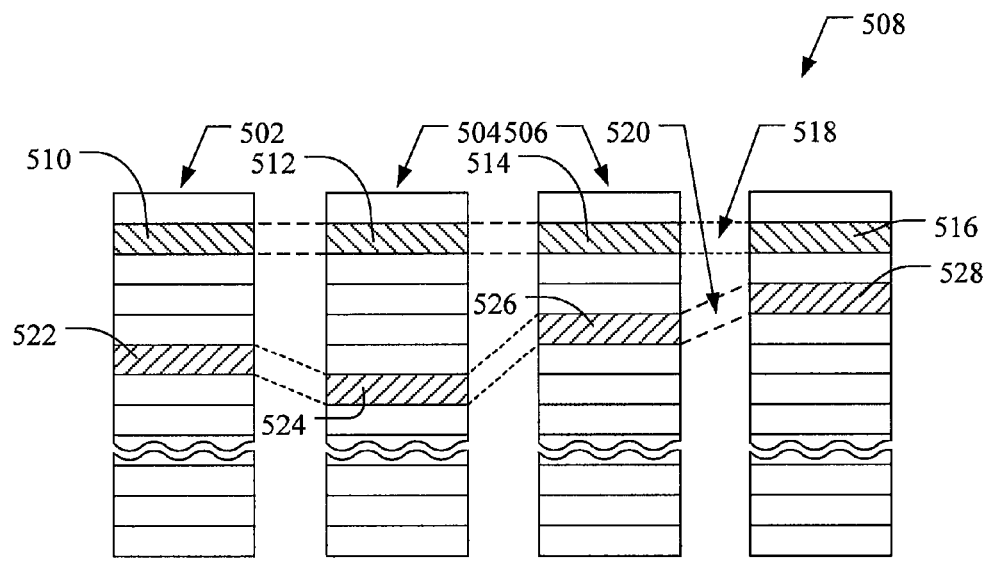
FIG. 5 illustrates an example physical memory organization of the memory bank of FIG. 3.

FIG. 5 conceptually illustrates a multiple plane arrangement showing four planes 502-508 of memory cells. These planes 502-508 may be on a single die, on two die (two of the planes on each die) or on four separate die. Of course, other numbers of planes, such as 1, 2, 8, 16 or more may exist in each die of a system. The planes are individually divided into blocks of memory cells shown in FIG. 5 by rectangles, such as blocks 510, 512, 514 and 516, located in respective planes 502-508. There can be dozens or hundreds of blocks in each plane.

As mentioned above, a block of memory cells is the unit of erase, the smallest number of memory cells that are physically erasable together. For increased parallelism, however, the blocks are operated in larger metablock units. One block from each plane is logically linked together to form a metablock. The four blocks 510-516 are shown to form one metablock 518. All of the cells within a metablock are typically erased together. The blocks used to form a metablock need not be restricted to the same relative locations within their respective planes, as is shown in a second metablock 520 made up of blocks 522-528. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 6:
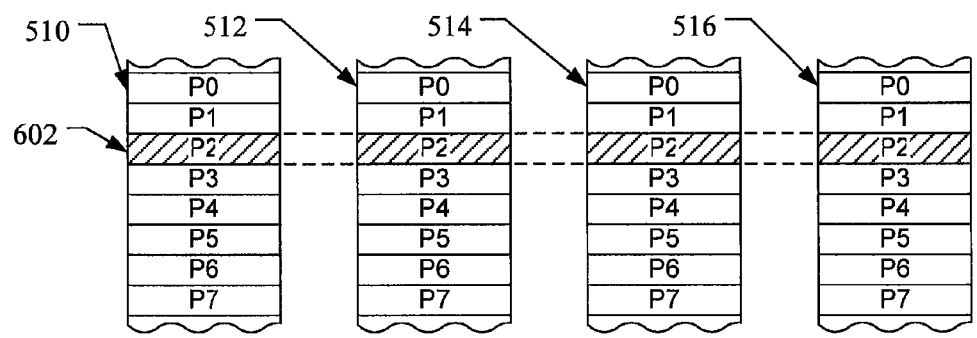
FIG. 6 shows an expanded view of a portion of the physical memory of FIG. 5.

The individual blocks are in turn divided for operational purposes into pages of memory cells, as illustrated in FIG. 6. The memory cells of each of the blocks 510-516, for example, are each divided into eight pages P0-P7. Alternatively, there may be 32, 64 or more pages of memory cells within each block. The page is the unit of data programming and reading within a block, containing the minimum amount of data that are programmed or read at one time. In the NAND architecture of FIG. 3, a page is formed of memory cells along a word line within a block. However, in order to increase the memory system operational parallelism, such pages within two or more blocks may be logically linked into metapages. A metapage 602 is illustrated in FIG. 6, being formed of one physical page from each of the four blocks 510-516. The metapage 602, for example, includes the page P2 in each of the four blocks but the pages of a metapage need not necessarily have the same relative position within each of the blocks.

The flash management layer in the controller firmware of the memory card may choose to allocate memory in terms of allocation units called logical groups. Writes that are less than a logical group size will result in the controller copying valid data stored at an original physical location to a new physical location in addition to the controller writing incoming data. This overhead decreases performance and endurance of the memory. In order to minimize this overhead, a group of memory is used as update blocks. An update block is usually a memory of better endurance than the data blocks. i.e, if the data blocks have MLC memory, the update blocks have SLC memory. Writes that are less than a logical group may result in the controller directing data into the update blocks, and after consolidation, the controller may copy data at a later point in time from the update block to one or more program data blocks. The controller performs these actions based on the fact that the update blocks are more durable and there is more possibility of collecting the entire logical group of data in the update blocks before writing into the data blocks, thus reducing overhead in the MLC memory. It is also more desirable to retain frequently written data blocks in the update block for similar reasons.

As stated above, in order to increase the performance and endurance of a storage system, a controller located in a host device or a storage system may monitor writes to a storage system and detect write patterns in data chunks written to the storage system. Once a write pattern is recognized and verified, the controller may utilize the detected write pattern to more efficiently perform storage management operations, thereby increasing the performance and endurance of the storage system. The controller may additionally utilize the detected write pattern to perform operations such as predicting misaligned page boundary writes and manipulating data writes to avoid the predicted misaligned page boundary writes before they occur.

Figure 7A:
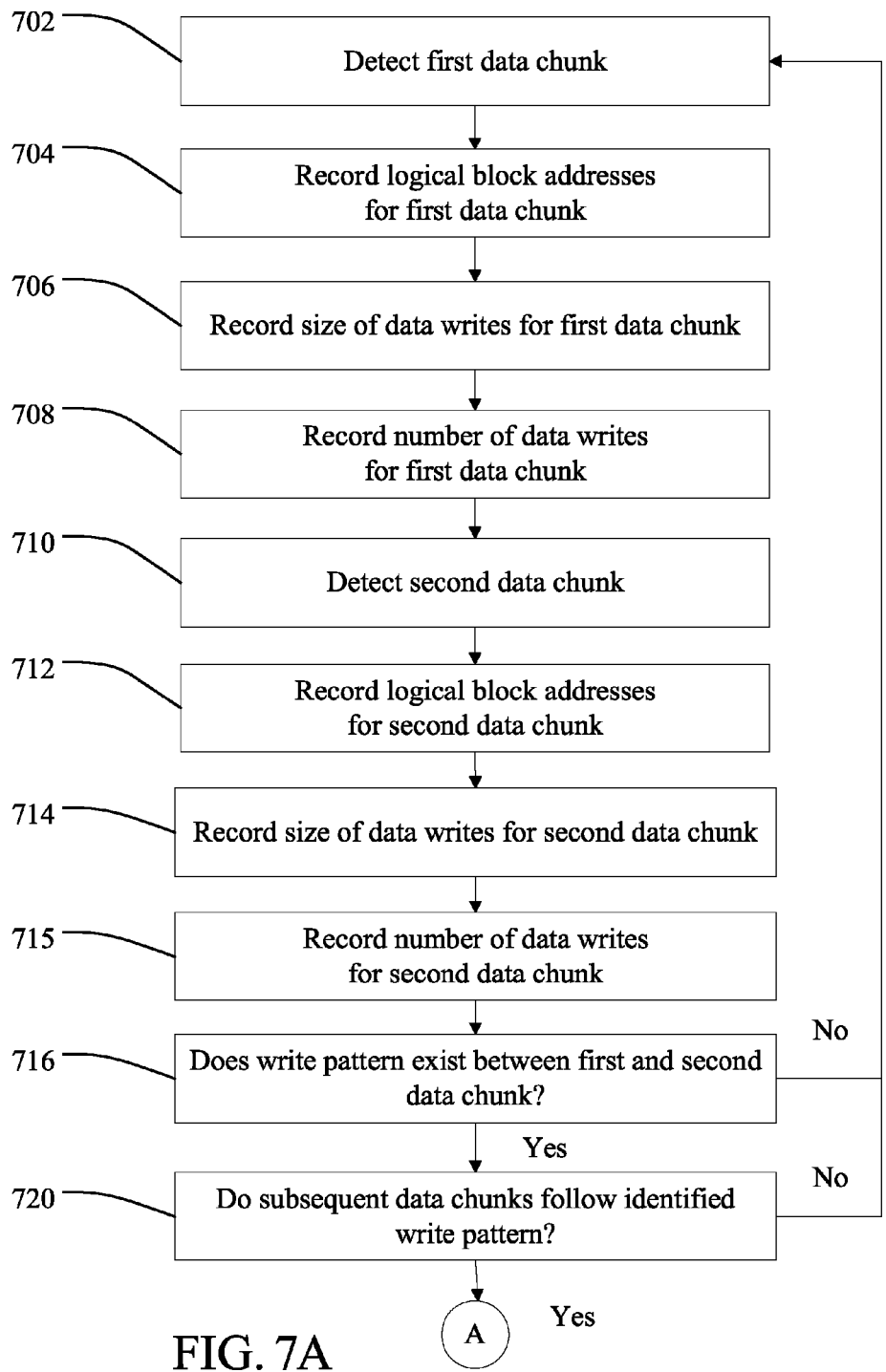
FIGS. 7a and 7b are a flow chart of one method for a controller to identify a write pattern in data chunks written to a storage system.
Figure 7B:
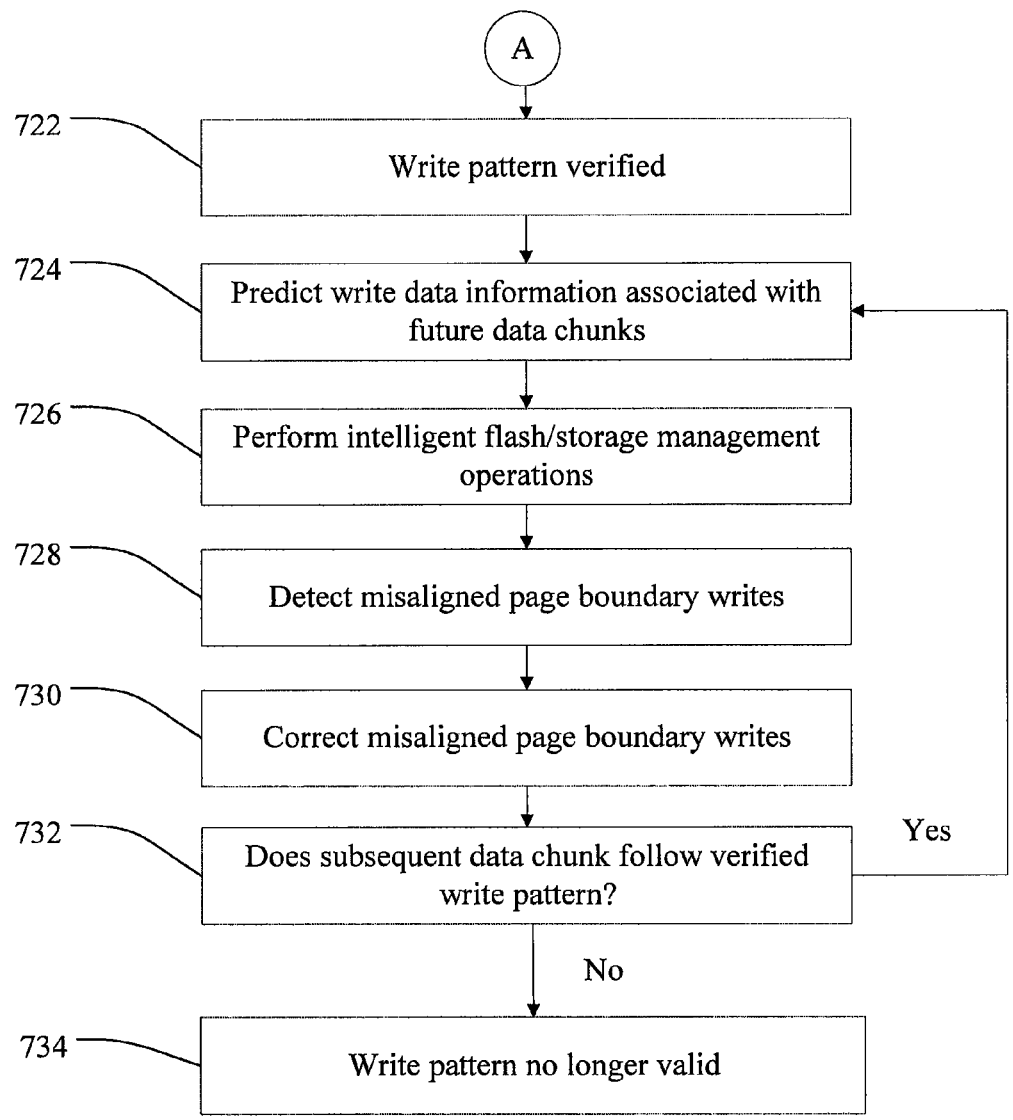

FIGS. 7a and 7b are a flow chart illustrating one method for a controller to identify a write pattern in data chunks written to a storage system. At step 702, a controller detects a set of writes to the storage system associated with a first data chunk. In some implementations, the controller detects a set of writes associated with a data chunk based on an amount of time prior to a series of writes and/or an amount of time after a series of writes until a next command. For example, if the controller determines a delay of more than 100 ms occurs before a series of writes, the controller may detect a beginning of a set of writes associated with a data chunk. Similarly, if the controller determines that a delay of more than 100 ms occurs after a series of writes before another command, the controller may detect an end of the set of writes associated with the data chunk.

At step 704, the controller may record logical block addresses for the set of writes associated with first data chunk in a first array. At step 706, the controller may record a write size associated with each write of the set of writes associated with the first data chunk in a second array. At step 708, the controller may further record a number of writes in the set of writes associated with the first data chunk.

At step 710, the controller detects a set of writes to the storage system associated with a second data chunk. As discussed above, in some implementations the controller may detect a set of writes associated with a data chunk based on an amount of time prior to a series of writes and/or an amount of time after a series of writes until a next command.

At step 712, the controller may record logical block addresses for the set of writes associated with the second data chunk in a third array. At step 714, the controller may record a write size associated with each write of the set of writes associated with the second data chunk in a fourth array. At step 715, the controller may further record a number of writes in the set of writes associated with the second data chunk.

At step 716, the controller utilizes the recorded data to determine whether a write pattern exists between the set of writes associated with the first data chunk and the set of writes associated with the second data chunk. In some implementations, the controller may determine whether a write pattern exists based on one or more of: whether the number of writes associated with the first data chunk is substantially equal to the number of writes associated with the second data chunk; a degree to which a sequence of logical block addresses associated with the first data chunk matches a sequence of logical block addresses associated with the second data chunk; and a degree to which a size of each data write associated with the first data chunk matches a size of each data write associated with the second data chunk.

Figure 8:
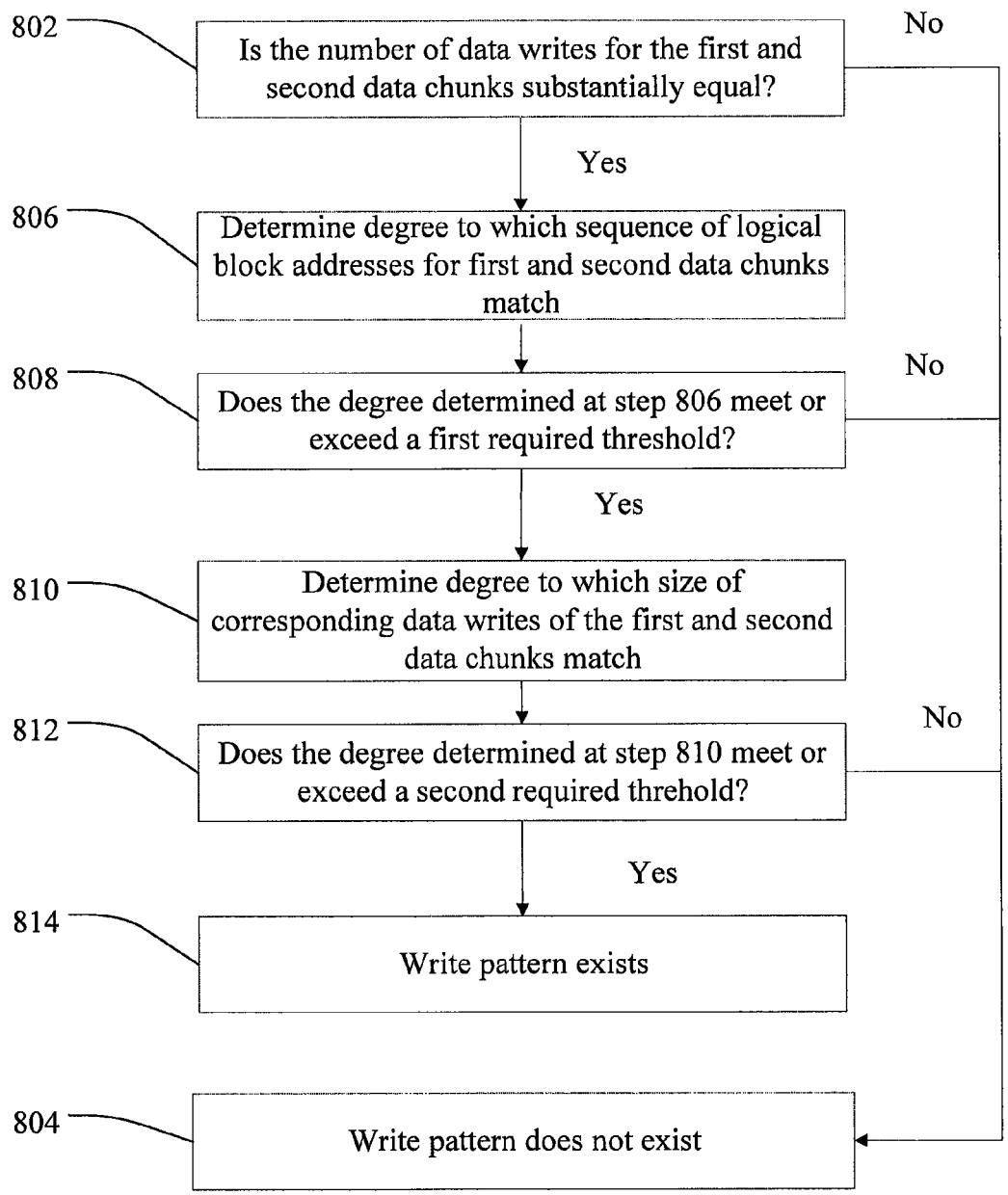
FIG. 8 is a flow chart of one implementation of a method for determining whether a write pattern exists between a set of writes associated with a first data chunk and a set of writes associated with a second data chunk.

FIG. 8 is a flow chart of one implementation of a method for determining whether a write pattern exists between the set of writes associated with the first data chunk and the set of writes associated with the second data chunk (step 716 of FIG. 7). At step 802, the controller determines whether the number of data writes associated with the first data chunk is substantially equal to the number of data writes associated with the second data chunk. In some implementations, the number of data writes associated with the first data chunk must be exactly equal to the number of data writes associated with the second data chunk in order for a write pattern to exist between the set of writes associated with the first data chunk and the set of writes associated with the second data chunk. However, in other implementations, the controller does not require that the number of data writes associated with the first data chunk be exactly equal to the number of data writes associated with the second data chunk in order for a write pattern to exist between the set of writes associated with the first data chunk and the set of writes associated with the second data chunk.

If the controller determines at step 802 that the number of data writes associated with the first data chunk is not substantially equal to the number of data chunks associated with the second data chunk, the controller determines at step 804 that a write pattern does not exist between the set of writes associated with the first data chunk and the set of writes associated with the second data chunk. However, if the controller determines at step 802 that the number of data writes associated with the first data chunk is substantially equal to the number of data chunks associated with the second data chunk, the method proceeds to step 806.

At step 806, the controller determines a degree to which the sequence of logical block addresses associated with the first data chunk matches the sequence of logical block addresses associated with the second data chunk. In some implementations, to perform this operation, the controller determines a series of logical block address offsets for the sequence of logical block addresses associated with the first data chunk by determining, for each sequential pair of logical block addresses, a difference between the two sequential logical block addresses. For example, for a sequence of logical block addresses [4B4B, 4B80, 4080, 4D80, 4E80, 4F80, 5080], the controller may determine the series of logical block address offsets to be [+35, +100, +100, +100, +100, +100].

The controller may then perform the same operation for the sequence of logical block addresses associated with the second data chunk. For example for a sequence of logical block addresses [4B5F, 50C0, 51C0, 52C0, 53C0, 54C0, 55C0], the controller may determine the series of logical block address offsets to be [+561, +100, +100, +100, +100, +100].

The controller may then determine a degree to which the sequence of logical block addresses associated with the first data chunk matches the sequence of logical block addresses associated with the second data chunk by comparing the series of logical block address offsets associated with the first data chunk to the series of logical block address offsets associated with the second data chunk. In some implementations, the degree to which the sequence of logical block addresses associated with the first data chunk matches the sequence of logical block addresses associated with the second data chunk may be expressed as a percentage of values of the series of logical block address offsets associated with the first data chunk that match the series of logical block address offsets associated with the second data chunk. Continuing with the example above, by comparing the series of logical block address offsets for the first data chunk [+35, +100, +100, +100, +100, +100] with the series of logical block address offsets for the second data chunk [+561, +100, +100, +100, +100, +100], five of the six values match, resulting in a degree of similarity of approximately 83%.

At step 808, the controller compares the determined degree to which the sequence of logical block addresses associated with the first data chunk matches the sequence of logical block addresses associated with the second data chunk to a threshold. In some implementations, the threshold may be set at 80%. However, it should be appreciated that the threshold may be set at any value at which a user and/or storage system manufacturer believes may be used to reliably indicate that a write pattern likely exists between the set of writes associated with the first data chunk and the set of writes associated with the second data chunk.

If the controller determines at step 808 that the determined degree to which the sequence of logical block addresses associated with the first data chunk matches the sequence of logical block addresses associated with the second data chunk is less than the threshold, the controller determines at step 804 that a write pattern does not exists between the set of writes associated with the first data chunk and the set of writes associated with the second data chunk. However, if the controller determines that step 808 that the determined degree to which the sequence of logical block addresses associated with the first data chunk matches the sequence of logical block addresses associated with the second data chunk meets or exceeds the threshold, the method proceeds to step 810.

At step 810, the controller determines a degree to which the size of each write of the set of data writes associated with the first data chunk matches the size of each corresponding write of the set of data writes associated with the second data chunk. In some implementations, the degree to which the size of each write of the set of data writes associated with the first data chunk matches the size of each corresponding write of the set of data writes associated with the second data chunk may be expressed as a percentage of the values of the size of data writes associated with the first data chunk that match the values of the size of the corresponding data writes associated with the second data chunk.

For example, a controller may determine that the size of each data write of the set of data writes associated with the first data chunk is [20, 256, 256, 256, 210, 3, 23] and determine that the size of each data write of the set of data writes associated with the second data chunk is [19, 256, 256, 256, 210, 3, 23]. In comparing the two sets of data, the controller may determine that six of the seven values match, resulting in a degree of similarity of approximately 86%.

At step 812, the controller compares the determined degree to which the size of each write of the set of data writes associated with the first data chunk matches the size of each corresponding write of the set of data writes associated with the second data chunk to a threshold. In some implementations, the threshold may be set at 80%. However, it should be appreciated that the threshold may be set at any value at which a user and/or storage system manufacturer believes may be used to reliably indicate that a write pattern likely exists between the set of writes associated with the first data chunk and the set of writes associated with the second data chunk.

If the controller determines at step 812 that the determined degree to which the size of each write of the set of data writes associated with the first data chunk matches the size of each corresponding write of the set of data writes associated with the second data chunk is less than the threshold, the controller determines at step 804 that a write pattern does not exists between the set of writes associated with the first data chunk and the set of writes associated with the second data chunk. However, if the controller determines at step 812 that the determined degree to which the size of each write of the set of data writes associated with the first data chunk matches the size of each corresponding write of the set of data writes associated with the second data chunk meets or exceeds the threshold, the controller determines at step 814 that a write pattern exists between the set of writes associated with the first data chunk and the set of writes associated with the second data chunk.

While the method for determining whether a write pattern exists between the set of writes associated with the first data chunk and the set of writes associated with the second data chunk (step 716 of FIG. 7) may consider factors such as whether the number of writes associated with the first data chunk is substantially equal to the number of writes associated with the second data chunk; a degree to which a sequence of logical block addresses associated with the first data chunk matches a sequence of logical block addresses associated with the second data chunk; and a degree to which a size of each data write associated with the first data chunk matches a size of each data write associated with the second data chunk, it will be appreciated that similar methods may examine less factors or additional factors in determining whether a write pattern exists.

Referring again to FIGS. 7a and 7b, if the controller determines at step 716 that a write pattern does not exists between the set of writes associated with the first data chunk and the set of writes associated with the second data chunk, the method loops to step 702 and the above-described steps are repeated. However, if the controller determines at step 716 that a write pattern does exists between the set of writes associated with the first data chunk and the set of writes associated with the second data chunk, the method proceeds to step 720.

At step 720 the controller determines whether or not sets of data writes associated with subsequent data chunks follow the write pattern identified at step 716. It will be appreciated that in some implementations, to determine whether or not sets of data writes associated with subsequent data chunks follow the identified write pattern, the controller may use a method similar to that described above in conjunction with FIG. 8 to compare a set of data writes associated with a subsequent data chunk to the set of data writes associated with the first data chunk and/or the set of data writes associated with the second data chunk, or the controller may compare a set of data writes associated with a subsequent data chunk directly to the write pattern identified in step 716.

In some implementations, in determining whether or not sets of data writes associated with subsequent data chunks follow the write pattern identified at step 716, the controller may examine additional factors such as whether or not a sequence exists between the logical block address of the first data write associated with the first data chunk, the logical block address of the first data write associated with the second data chunk, and the logical block address of the first data write associated with each subsequent data chunk.

For example, the controller may determine that a logical block address of the first data write associated with the first data chunk is 4B4B and the size of the data chunk is 0x14; that a logical block address of the first data write associated with the second data chunk is 4B5F and the size of the data chunk is 0x13; and that a logical block address of the first data write associated with a third data chunk (a first subsequent data chunk) is 4B72. The controller may determine that a difference between logical block address 4B4B and logical block address 4B5F is 0x14, which matches with the size of the first data write of the previous chunk, and that a difference between logical block address 4B5F and logical block address 4B72 is 0x13, which also matches with the size of the first data write of the previous data chunk. Therefore, the controller will determine that a sequence exists between the logical block addresses of the data writes of the first and second data chunks and the first subsequent data chunk, and examine the logical block address of a first data write associated with further subsequent data chunks to determine whether the logical block addresses continue to follow the identified sequence.

The controller may verify that a write pattern exists after determining that a predetermined number of sets of data writes associated with subsequent data chunks follow the write pattern. In some implementations, the controller may verify that the write pattern exists after determining sets of data writes associated with five subsequent data chunks follow the write pattern. However, in other implementations, other predetermined number of sets of data writes associated with subsequent data chunks may be used.

If the controller determines at step 720 that one or more sets of data writes associated with subsequent data chunks do not follow the identified write pattern, the method loops to step 702 and the above-described steps are repeated. It will be appreciated that when the controller determines that the identified write pattern is not repeated, the controller may maintain one or more logical addresses associated with the first and/or second data chunks in an update block and perform normal storage management operations on the data.

Alternatively, if the controller determines at step 720 that a set of data writes associated with a predetermined number of subsequent data chunks do follow the identified write pattern, the controller determines at step 722 that the write pattern is verified.

At step 724, the controller utilizes the verified write pattern to predict write data information for future data chunks, such as one or more logical block address associated with future data chunks. In some implementations, the controller may predict a logical block address of a first data write of a set of data writes associated with a future data chunk; a number of data writes within a set of data writes associated with a future data chunk; a size of each data write of a set of data writes associated with a future data chunk; a logical block address associated with each data write of a set of data writes associated with a future data chunk; and/or a logical block address offset between each set of subsequent data writes of a set of data writes associated with a future data chunk.

At step 726, the controller may perform one or more intelligent storage management operations based on the predicted write data information associated with future data chunks. For example, if the controller determines based on the verified write pattern that one or more logical block address stored in an update block will not be updated again for a defined period of time, the controller may store the one or more logical address blocks in a data block of the storage system to increase available space in the update block.

Similarly, if the contents of an update block need to be stored in a data block of the storage system to increase available space in the update block, but the controller determines based on the verified write pattern that one or more logical block addresses stored in the update block will be updated again within a defined period of time, the controller may retain the one or more logical block addresses in the update block and store the remaining logical block addresses within a data block of the storage system to increase available space in the update block.

At step 728, the controller may utilize the predicted write data information associated with future data chunks to detect misaligned page boundary writes. Misaligned page boundary writes occur when the host writes do not align with a physical page boundary. For example, a misaligned page boundary write may occur when a size of a physical page is 16 kB and the host sends a first write to a memory system directed to 1 kB to 17 kB space and the host sends a second write to the memory system directed to 17 kB to 33 kB space.

When the controller detects a misaligned page boundary write at step 728, the controller may correct the misaligned page boundary write at step 730. In some implementations, to correct the misaligned page boundary write, the controller may store a first portion of the data for the data write in a buffer until the second portion of the data write is received so that the first and second portions of the data write may be stored in the same page of memory. It will be appreciated that storing data in a buffer typically poses a risk in that data may be lost if the buffer loses power, such as when a memory system loses power. However, by utilizing the verified write sequence to predict future write data information, the risk is minimized because the controller is able utilize a buffer more efficiently since the controller knows when to expect future data writes.

It will be appreciated that as the controller performs actions such as predicting write data information associated with future data chunks (step 724), performing intelligent storage management operations (step 726), and monitoring for and correcting misaligned page boundary writes (steps 728 and 730), the controller may monitor sets of data writes for the subsequent data chunks at step 732 to determine whether or not the sets of data writes for the subsequent data chunks follow the write pattern. It will be appreciated that in some implementations the controller may determine whether or not the set of writes for the subsequent data chunks follow the write pattern by utilizing the method described above in conjunction with FIG. 8 or by comparing the writes associated with the subsequent data chunk directly to the identified write pattern.

As the controller determines at step 732 that a set of data writes for a subsequent data chunk follows the write pattern, the method loops to step 724 and the above-described method continues. However, if the controller determines at step 732 that a set of data writes for a subsequent data chunk does not follow the write pattern, the controller determines at step 734 that the write pattern is no longer valid. The above-described method may then be repeated starting at step 702 and the controller may begin to look for a new write pattern.

FIGS. 1-8 illustrate systems and methods for performing intelligent flash management. As explained above, a controller located in a host device or a storage device may monitor writes to a storage system and detect write patterns to the storage system. Once a write pattern is recognized, the controller may utilize the detected write pattern to perform operations such as more efficiently performing storage management operations or correcting misaligned page boundary writes, thereby increasing performance and endurance of the storage system.

It is intended that the foregoing detailed description be regarded as illustrative rather than limiting, and that it be understood that it is the following claims, including all equivalents, that are intended to define the spirit and scope of this invention.

The invention claimed is:

1. In a processor of a storage system, a method for performing storage management operations, the method comprising:
   determining whether a number of writes to a storage device to store a first data chunk at the storage device is equal to a number of writes to the storage device to store a second data chunk at the storage device;
   determining a degree to which a sequence of logical block addresses where the first data chunk is stored at the storage device matches a sequence of logical block addresses where the second data chunk is stored at the storage device;
   determining a degree to which a size of each write of data to store the first data chunk at the storage device matches a size of each write of data to store the second data chunk at the storage device;
   determining whether or not a write pattern exists based on at least one of the determination of whether the number of writes to store the first data chunk is equal to the number of writes to store the second data chunk, the degree to which the sequence of logical block addresses where the first data chunk is stored matches the sequence of logical block addresses where the second data chunk is stored, or the degree to which the size of each write to store the first data chunk matches the size of each write to store the second data chunk; and
   performing storage management operations within the storage device based on the determination of whether or not a write pattern exists.

2. The method of claim 1, wherein determining whether or not a write pattern exists comprises:
   determining a write pattern does not exist based on at least one of:
      determining that the number of writes to store the first data chunk is not equal to the number of writes to store the second data chunk,
      determining that the degree to which the sequence of logical block where addresses the first data chunk is stored matches the sequence of logical block addresses where the second data chunk is stored is less than a first threshold, or determining that the degree to which the size of each write to store the first data chunk matches the size of each write to store the second data chunk is less than a second threshold.

3. The method of claim 2, wherein performing storage management operations within the storage device based on the determination of whether or not a write pattern exists comprises:
maintaining logical block addresses associated with at least one of the first data chunk and the second data chunk in an update block based on the determination that a write pattern does not exist.

4. The method of claim 1, wherein determining whether or not a write pattern exists comprises:
determining a write pattern exists based on determining the number of writes to store the first data chunk is equal to the number of writes to store the second data chunk, determining the degree to which the sequence of logical block addresses where the first data chunk is stored matches the sequence of logical block addresses where the second data chunk is stored meets or exceeds a first threshold, and determining the degree to which the size of each write to store the first data chunk matches the size of each write to store the second data chunk meets or exceeds a second threshold.

5. The method of claim 4, further comprising:
predicting one or more logical block addresses where writes will occur after a period of time based on the determination that a write pattern exists;
wherein performing storage management operations comprises restoring data stored at the one or more predicted logical block addresses in the update block.

6. The method of claim 4, further comprising:
predicting one or more logical block addresses where no writes will occur within a period of time based on the determination that a write pattern exists;
wherein performing storage management operations comprises writing data stored at the one or more predicted logical block addresses to a data block.

7. The method of claim 4, further comprising:
after determining that a write pattern exists:
determining whether a number of writes to the storage device to store the first data chunk is equal to a number of writes to the storage device to store a third data chunk;
determining a degree to which a sequence of logical block addresses where the first data chunk is stored matches a sequence of logical block addresses where the third data chunk is stored;
determining a degree to which a size of each write of data to store the first data chunk matches a size of each write of data to store the third data chunk; and
determining that the write pattern has ceased based on at least one of:
determining that the number of writes to store the first data chunk is not equal to the number of writes to store the third data chunk,
determining that the degree to which the sequence of logical block addresses where the first data chunk is stored matches the sequence of logical block addresses where the third data chunk is stored is less than the first threshold, or
determining that the degree to which the size of each write to store the first data chunk matches the size of each write of data to store the third data chunk is less than the second threshold.

8. The method of claim 4, further comprising:
predicting a misaligned page boundary write associated with a third data chunk based on the determined write pattern; and
adjusting, based on the predicted misaligned page boundary write, one or more writes of data to the storage device associated with the third data chunk to avoid a misaligned page boundary write.

9. The method of claim 1, further comprising:
determining whether a number of writes to the storage device to store the first data chunk is equal to a number of writes to the storage device to store a third data chunk;
determining a degree to which a sequence of logical block addresses where the first data chunk is stored matches a sequence of logical block addresses where the third data chunk is stored; and
determining a degree to which a size of each write of data to store the first data chunk matches a size of each write of data to store the third data chunk;
wherein determining whether or not a write pattern exists comprises determining whether or not a write pattern exists based on at least one of:
the determination of whether the number of writes to store the first data chunk is equal to the number of writes to store the second data chunk,
the degree to which the sequence of logical block addresses where the first data chunk is stored matches the sequence of logical block addresses where the second data chunk is stored,
the degree to which the size of each write to store the first data block matches the size of each write to store the second data chunk;
the determination of whether the number of writes to store the first data chunk is equal to the number of writes to store the third data chunk,
the degree to which the sequence of logical block addresses where the first data chunk is stored matches the sequence of logical block addresses where the third data chunk, or
the degree to which the size of each write to store the first data chunk matches the size of each write to store the third data chunk.

10. The method of claim 9, wherein determining whether or not a write pattern exists comprises determining a write pattern exists based on:
determining that the number of writes to store the first data chunk is equal to the number of writes to store the second data chunk,
determining that the degree to which the sequence of logical block addresses where the first data chunk is stored matches the sequence of logical block addresses where the second data chunk is stored meets or exceeds a first threshold,
determining that the degree to which the size of each write to store the first data chunk matches the size of each write to store the second data chunk meets or exceeds a second threshold;
determining that the number of writes to store the first data chunk is equal to the number of writes to store the third data chunk,
determining that the degree to which the sequence of logical block addresses where the first data chunk is stored matches the sequence of logical block addresses where the third data chunk is stored meets or exceeds the first threshold, and determining that the degree to which the size of each write to store the first data block matches the size of each write to store the third data chunk meets or exceeds the second threshold.

11. A storage system comprising:
a non-volatile memory; and
a processor in communication with the non-volatile memory, the processor configured to:
    determine whether a number of writes to the non-volatile memory to store a first data chunk at the non-volatile memory is equal to a number of writes to the non-volatile memory to store a second data chunk at the non-volatile memory;
    determine a degree to which a sequence of logical block addresses where the first data chunk is stored at the non-volatile memory matches a sequence of logical block addresses where the second data chunk is stored at the non-volatile memory;
    determine a degree to which a size of each write of data to store first data chunk at the non-volatile memory matches a size of each write of data to store the second data chunk at the non-volatile memory;
    determine whether or not a write pattern exists based on at least one of the determination of whether the number of writes to store the first data chunk is equal to the number of writes to store the second data chunk, the degree to which the sequence of logical block addresses where the first data chunk is stored matches the sequence of logical block addresses where the second data chunk is stored, or the degree to which the size of each write to store the first data chunk matches the size of each write to store the second data chunk; and
    perform storage management operations within the non-volatile memory based on the determination of whether or not a write pattern exists.

12. The storage system of claim 11, wherein to determine whether or not a write pattern exists, the processor is further configured to:
    determine a write pattern does not exist based on at least one of:
        a determination that the number of writes to store the first data chunk is not equal to the number of writes to store the second data chunk,
        a determination that the degree to which the sequence of logical block addresses where the first data chunk is stored matches the sequence of logical block addresses where the second data chunk is stored is less than a first threshold, or
        a determination that the degree to which the size of each write to store the first data chunk matches the size of each write to store the second data chunk is less than a second threshold.

13. The storage system of claim 12, wherein to perform storage management operations within the non-volatile memory based on the determination of whether or not a write pattern exists, the processor is further configured to:
    maintain logical block addresses associated with at least one of the first data chunk and the second data chunk in an update block based on the determination that a write pattern does not exist.

14. The storage system of claim 11, wherein to determine whether or not a write pattern exists, the processor is further configured to:
    determine a write pattern exists based on determining the number of writes to store the first data chunk is equal to the number of writes to store the second data chunk, determining the degree to which the sequence of logical block addresses where the first data chunk is stored matches the sequence of logical block addresses where the second data chunk is stored meets or exceeds a first threshold, and determining the degree to which the size of each write to store the first data chunk matches the size of each write to store the second data chunk meets or exceeds a second threshold.

15. The storage system of claim 14, wherein the processor is further configured to:
    predict one or more logical block addresses where no writes will occur within a period of time based on the determination that a write pattern exists;
    wherein to perform storage management operations, the processor is configured to write data stored at the one or more predicted logical block address to a data block.

16. The storage system of claim 14, wherein the processor is further configured to:
    predict one or more logical block addresses where writes will occur after a period of time based on the determination that a write pattern exists;
    wherein to perform storage management operations, the processor is configured to restore data stored at the one or more predicted logical block addresses in the update block.

17. The storage system of claim 14, wherein the processor is further configured to:
    after a determination that a write pattern exists:
        determine whether a number of writes to the non-volatile memory to store the first data chunk is equal to a number of writes to the non-volatile memory to store a third data chunk;
        determine a degree to which a sequence of logical block addresses where the first data chunk is stored matches a sequence of logical block addresses where the third data chunk is stored;
        determine a degree to which a size of each write of data to store the first data chunk matches a size of each write of data to store the third data chunk; and
        determine that the write pattern has ceased based on at least one of:
            a determination that the number of writes to store the first data chunk is not equal to the number of writes to store the third data chunk,
            a determination that the degree to which the sequence of logical block addresses where the first data chunk is stored matches the sequence of logical block addresses where the third data chunk is stored is less than the first threshold, or
            a determination that the degree to which the size of each write to store the first data chunk matches the size of each write of data to store the third data chunk is less than the second threshold.

18. The storage system of claim 14, wherein the processor is further configured to:
    predict a misaligned page boundary write associated with a third data chunk based on the determined write pattern; and
    adjust, based on the predicted misaligned page boundary write, one or more writes of data to the non-volatile memory associated with the third data chunk to avoid a misaligned page boundary write.

19. The storage system of claim 11, wherein the processor is further configured to:
- determine whether a number of writes to the non-volatile memory to store the first data chunk is equal to a number of writes to the non-volatile memory to store a third data chunk;
- determine a degree to which a sequence of logical block addresses where the first data chunk is stored matches a sequence of logical block addresses where the third data chunk is stored; and
- determine a degree to which a size of each write of data to store the first data chunk matches a size of each write of data to store the third data chunk;
- wherein to determine whether or not a write pattern exists, the processor is further configured to determine whether or not a write pattern exists based on at least one of:
  - the determination of whether the number of writes to store the first data chunk is equal to the number of writes to store the second data chunk,
  - the degree to which the sequence of logical block addresses where the first data chunk is stored matches the sequence of logical block addresses where the second data chunk is stored,
  - the degree to which the size of each write for the first data block matches the size of each write for the second data chunk;
  - the determination of whether the number of writes to store the first data chunk is equal to the number of writes to store the third data chunk,
  - the degree to which the sequence of logical block addresses where the first data chunk is stored matches the sequence of logical block addresses where the third data chunk is stored, or
  - the degree to which the size of each write to store the first data chunk matches the size of each write to store the third data chunk.

20. The storage system of claim 19, wherein to determine whether or not a write pattern exists, the processor is configured to determine a write pattern exists based on:
- a determination that the number of writes to store the first data chunk is equal to the number of writes to store the second data chunk,
- a determination that the degree to which the sequence of logical block addresses where the first data chunk is stored matches the sequence of logical block addresses where the second data chunk is stored exceeds a first threshold,
- a determination that the degree to which the size of each write to store the first data chunk matches the size of each write to store the second data chunk exceeds a second threshold;
- a determination that the number of writes to store the first data chunk is equal to the number of writes to store the third data chunk,
- a determination that the degree to which the sequence of logical block addresses where the first data chunk is stored matches the sequence of logical block addresses where the third data chunk is stored exceeds the first threshold, and
- a determination that the degree to which the size of each write to store the first data block matches the size of each write to store the third data chunk exceeds the second threshold.

21. The storage system of claim 11, wherein the non-volatile memory comprises flash memory.

22. The storage system of claim 11, wherein the storage management operations comprises garbage collection operations.

* * * * *